United States Patent
Wei et al.

(10) Patent No.: US 12,153,181 B2
(45) Date of Patent: Nov. 26, 2024

(54) NOISE REDUCTION MEASUREMENT METHOD OF ACOUSTIC WHILE DRILLING DATA BASED ON SIGNAL SYNCHRONIZATION

(71) Applicant: Institute of Geology and Geophysics, Chinese Academy of Sciences, Beijing (CN)

(72) Inventors: Fuqiang Wei, Beijing (CN); Yuntao Sun, Beijing (CN); Wenxiu Zhang, Beijing (CN); Jian Zheng, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/428,300

(22) Filed: Jan. 31, 2024

(65) Prior Publication Data
US 2024/0272323 A1    Aug. 15, 2024

(30) Foreign Application Priority Data
Feb. 14, 2023    (CN) .......................... 202310112576.6

(51) Int. Cl.
*G01V 1/50*    (2006.01)
(52) U.S. Cl.
CPC ............ *G01V 1/50* (2013.01); *G01V 2200/16* (2013.01); *G01V 2210/3246* (2013.01)

(58) Field of Classification Search
CPC .................. G01V 2210/3246; G01V 2200/16
See application file for complete search history.

(56) References Cited

U.S. PATENT DOCUMENTS 9,491,770 B1 *   11/2016    Heninwolf ............ H04W 72/54

FOREIGN PATENT DOCUMENTS

| CA | 2713976 A1 * | 6/2009 | ............. G01V 1/157 |
| CA | 2893150 C  * | 5/2020 | ............ E21B 47/182 |

OTHER PUBLICATIONS

Deal, CN 1290351, English Translation (Year: 2001).*

* cited by examiner

Primary Examiner — Michael J Dalbo
(74) Attorney, Agent, or Firm — NKL Law; Allen Xue (57) ABSTRACT

A noise reduction measurement method of acoustic while drilling data based on signal synchronization is provided. The method performs pre-sampling before effective excitation of a low-frequency pulser, then extracts center frequency and phase information of noise of the low-frequency pulser by fast Fourier transform, and adjusts the excitation and sampling time of the acoustic signal according to the center frequency and phase information of the noise of the low-frequency pulser. Accordingly, the coincidence of the acoustic signal excited by the acoustic instrument and the acoustic signal generated by operation excitation of the pulser can be actively avoided, and the signal-to-noise ratio of the received signal of the acoustic instrument can be effectively improved.

8 Claims, 5 Drawing Sheets

FIG. 5

NOISE REDUCTION MEASUREMENT METHOD OF ACOUSTIC WHILE DRILLING DATA BASED ON SIGNAL SYNCHRONIZATION

TECHNICAL FIELD

The present disclosure relates to the field of acoustic noise reduction while drilling, and more particularly to a noise reduction measurement method of acoustic while drilling data based on signal synchronization.

BACKGROUND

The impulse pump is now used as a key component for the uploading and downloading of data in the logging while drilling process. The cycle frequency of the impulse pump is typically 0.5-1.2 bit/s, and the noise generated by the impulse pump is much larger than the effective signal excited by the transmitting transducer. As a result, the effective signal is drowned in the noise in the signals collected by the acquisition circuit, and even the noise signal will cause the signal overshoot of the acquisition circuit and the effective signal is completely lost.

The current receiver strip adopts a combination of a fourth-order low-pass filter and a sixth-order high-pass filter. The cut-off frequency of the fourth-order low-pass filter is 30 Khz, and the return loss is 3 dB. When the frequency is 95 KHz, the return loss is 40 dB, the cut-off frequency of the sixth-order high-pass filter is 200 Hz, and the return loss is 3 dB. When the frequency is 90 Hz, the return loss is 40 dB. At the same time, in order to amplify the received signal, the combination of the fixed gain and variable programming gain is adopted, the maximum amplification factor is 1024 and the minimum amplification factor is 1.

First, a receiving transducer converts the acoustic signal into a voltage signal. The voltage signal first enters an operational amplifier 1 through a voltage dividing resistor for amplification once with a fixed gain, then passes through a programmable amplifier, the fourth-order low-pass filter, a programmable amplifier, the sixth-order high-pass filter and an AD conversion chip, and finally is transmitted to an acquisition board. Since the cut-off voltage of the AD conversion chip is 5V, the comparison voltage is 2.048 V. When sampling occurs during impulse pump excitation, the amplitude of the electrical signal generated by the receiving transducer exceeds ±5V after passing through the voltage dividing resistor and the operational amplifier 1, which leads to the overshoot of AD conversion after subsequent amplification and the loss of the effective signal of acoustic data.

SUMMARY

The purpose of this section is to summarize some aspects of embodiments of the disclosure and to briefly introduce some of the preferred embodiments. Simplifications or omissions may be made in this section and in the abstract of the specification and the title of the disclosure herein to avoid obscuring the purpose of this section, the abstract of the specification and the title of the disclosure, and such simplifications or omissions cannot be used to limit the scope of the disclosure.

In view of the above and/or existing problems, the present disclosure provides a noise reduction measurement method of acoustic while drilling data based on signal synchronization.

The acoustic data acquired in the excitation gap of the pulser is complete and effective in waveform and high in signal-to-noise ratio, and powerful support is also provided for subsequent data processing.

The present disclosure adopts the following technical solutions:

in one aspect, the present disclosure provides a noise reduction measurement method of acoustic while drilling data based on signal synchronization, the method performs pre-sampling on an acoustic signal while drilling at every set time interval, then extracts center frequency and phase information of noise of a low-frequency impulse pump by fast Fourier transform, and adjusts the excitation and sampling time of the acoustic signal according to the center frequency and phase information of the noise of the low-frequency impulse pump; wherein the acoustic signal while drilling includes the noise signal of the low-frequency impulse pump and an excitation sound signal of an acoustic instrument.

As any one of possible implementation modes described above, an implementation mode is further provided, the method specifically includes:

S1, setting a timer time1, performing pre-sampling at every set time interval;

S2, performing fast Fourier transform processing on raw data of a pre-sampled acoustic signal to obtain corresponding spectral data, traversing and comparing the spectral data to obtain a center frequency f of the low-frequency impulse pump;

S3, performing adaptive filtering on raw data of the pre-sampled adaptively filtering the pre-sampled raw data according to the center frequency f to remove spike noise interference in the raw data;

S4, processing the adaptively filtered acoustic signal data in step S3 to find a maximum value in each cycle, and the phase being $\pi/2$; then obtaining a sampling point corresponding to a 0 phase according to the center frequency f so as to obtain real-time phase information of a low-frequency impulse pump acoustic signal; and S5, determining a transmission interval of an acoustic instrument according to the center frequency f; and determining, based on the real-time phase information of the low-frequency impulse pump acoustic signal, the sampling time of the acoustic signal by a receiver strip such that the collected acoustic signal is near the 0 phase of the low-frequency impulse pump acoustic signal, and data overshoot is avoided.

As any one of possible implementation modes described above, an implementation mode is further provided, the 0 phase of the low-frequency impulse pump acoustic signal is re-determined after each power-on of the low-frequency impulse pump, and the 0 phase of the low-frequency impulse pump acoustic signal is re-synchronized with the sampling time.

As any one of possible implementation modes described above, an implementation mode is further provided, in the working process of the low-frequency impulse pump, the synchronization operation is performed once on the sampling time every 10 minutes to reduce the influence of frequency shift and jitter of the impulse pump.

As any one of possible implementation modes described above, an implementation mode is further provided, in step S1, the pre-sampling is performed once every 10 minutes, the sampling frequency is set to 200 Hz, the sampling length is 1000 points, and the sampling duration is 5 s by means of equal interval sampling, and a timer counter Time2 starts counting at the same time the sampling starts, and the counting cycle is 5 ms.

As any one of possible implementation modes described above, an implementation mode is further provided, in step S4, the filtered acoustic signal data is compared by bubble sort algorithm to find a maximum value in each cycle, and the phase is π/2; and the real-time phase information of the low-frequency impulse pump signal is obtained by the following method:

when starting sampling, starting counting at the same time by the timer counter Time2, wherein the timer counter Time2 is always in a state of accumulating counting, the value of a first point of the sampling data corresponding to the timer counter Time2 is 1, if the sampling point corresponding to the 0 phase is the t-th, when the value of the timer counter Time2 is t, the corresponding impulse pump signal is 0 phase; according to the center frequency f and a counter real-time value N of the timer counter Time2, obtaining the real-time phase information of the impulse pump signal:

$$\varphi_w = \frac{((N-t)\% \ Tn)}{Tn} * 2\pi;$$

wherein: $\varphi_w$ is the real-time phase of the impulse pump transmission cycle; Tn is the number of sampling points included in each impulse pump transmission cycle, Tn=200/f.

As any one of possible implementation modes described above, an implementation mode is further provided, step S5 is specifically as follows:

according to the center frequency f, determining the transmission interval of the acoustic instrument to be T2=M*(1/f), wherein M is a positive integer greater than 0, i.e. the transmission interval of the acoustic instrument is an integral multiple of the transmission cycle of the impulse pump;

according to the counter real-time value N of the Time2, determining a counter value $T_w=t+N_w*Tn$ of the Time2 corresponding to the first sampling time, wherein $N_w$ is a positive integer, i.e. the sampling time is consistent with the time corresponding to the 0 phase of the impulse pump transmission cycle; and according to a difference value Time3 between an acoustic emitting time and a receiving time, obtaining the counter value of the Time2 corresponding to the acoustic emitting time T3 as Tm, setting the cycle of a timer Time4 as T2 and the triggering mode as cyclic triggering, when the counter value of the Time2 is Tm, starting the timer Time4, immediately exciting an acoustic emitting waveform once every time the timer Time4 interrupts triggering, starting to collect the acoustic signal after a delay of Time3 by a receiver strip with a sampling frequency of 100 Khz, a sampling length of 1000 points and a sampling duration of 10 ms; and ensuring that the sampled data is near the 0 phase of the low-frequency impulse pump acoustic signal.

As any one of possible implementation modes described above, an implementation mode is further provided, the transmission interval T2 of the acoustic instrument satisfies 5 s<T2<10 s.

In another aspect, the present disclosure also provides an information data processing terminal for realizing the method for noise reduction measurement of acoustic while drilling data based on signal synchronization as described above.

In another aspect, the present disclosure also provides an embedded processor-readable storage medium including instructions which, when run on an embedded processor, cause the embedded processor to execute the method for noise reduction measurement of acoustic while drilling data based on signal synchronization as described above.

The beneficial effects of the disclosure are that: compared with the traditional analog high-pass filter, the disclosure has good suppressing effect on the low-frequency impulse noise generated by a specific noise source, i.e. the mud pulser. Specifically, through the processing of the disclosure, the instrument can adapt to the low-frequency pulsers with different frequency output autonomously, the acoustic data can be sampled when the pulser is not excited, thus actively avoiding the coincidence of the acoustic signal excited by the acoustic instrument and the acoustic signal generated by operation excitation of the pulser, and effectively improving the signal-to-noise ratio of the received signal of the acoustic instrument. If the method used in the disclosure is not adopted, because the amplitude of the noise signal often exceeds the measurement interval of an AD chip, the effective signal of the acoustic instrument will be completely overshot and the effective signal will be completely lost.

BRIEF DESCRIPTION OF FIGURES

In order to illustrate the technical solutions of the embodiments of the present disclosure more clearly, the accompanying drawings needed to be used in the description of the embodiments will be briefly introduced below, it is obvious that the accompanying drawings in the description below are merely some embodiments of the present disclosure, for those of ordinary skill in the art, other drawings can be obtained from these drawings without creative labor. Wherein.

DETAILED DESCRIPTION

In order to make the above objects, features and advantages of the present disclosure more readily understood, a detailed description of specific embodiments of the present disclosure will be given below in combination with the accompanying drawings of the specification.

Many specific details are set forth in the following description to facilitate a full understanding of the disclosure, but the disclosure may also be practiced in other manners different from those described herein, and those skilled in the art may similarly promote the disclosure without departing from the connotation of the disclosure so that the disclosure is not limited by the specific embodiments disclosed below.

Second, the term "one embodiment" or "embodiment" herein refers to a particular feature, structure, or characteristic that may be included in at least one implementation mode of the present disclosure. The phrase "in one embodiment" that appears in different places in this specification does not always refer to the same embodiment, nor is it an embodiment that is separate or selectively mutually exclusive with other embodiments.

Figure 1:
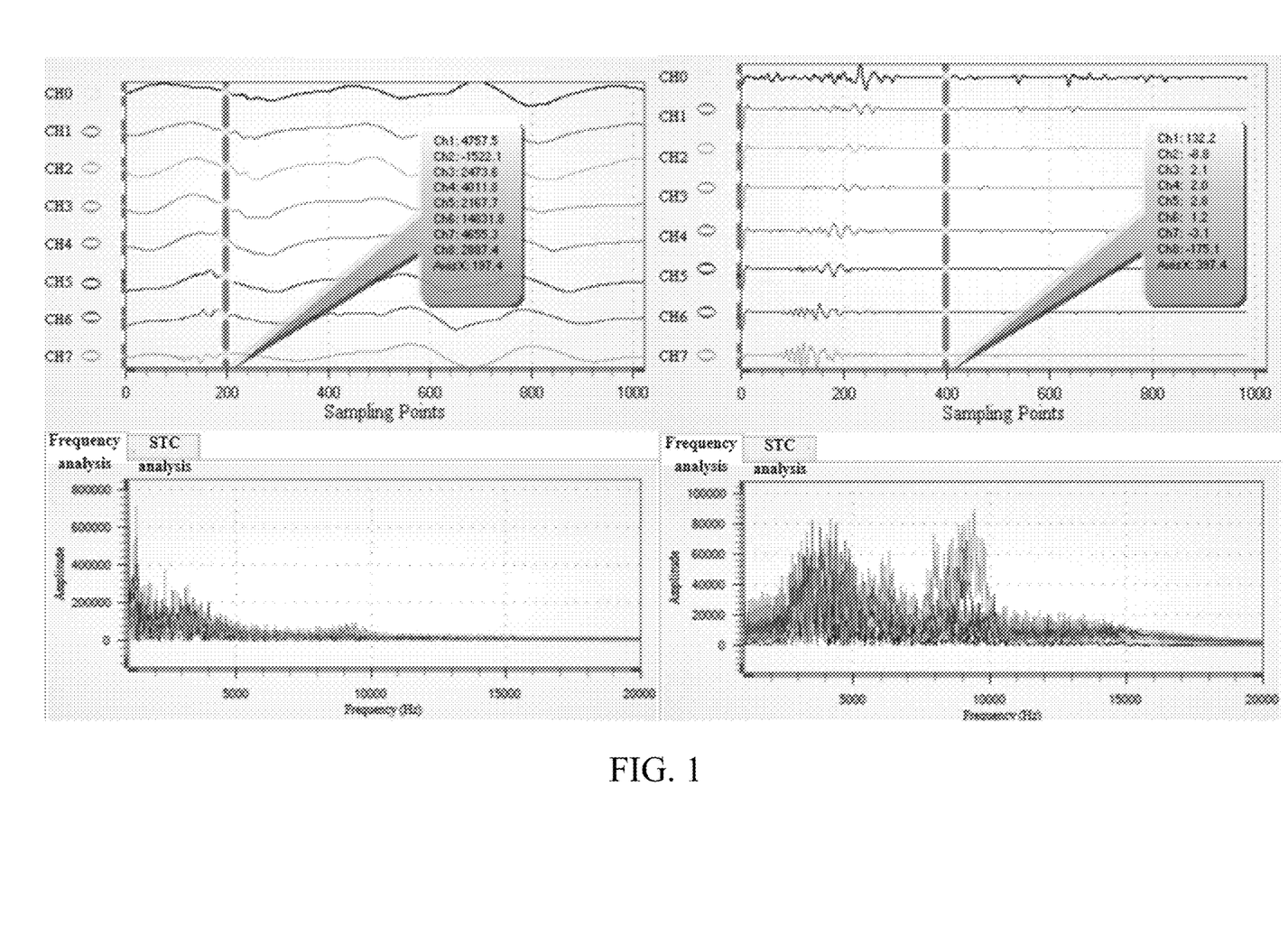
FIG. 1 is a comparison diagram of the raw data and the processed data when the pulser interference is small.
Figure 2:
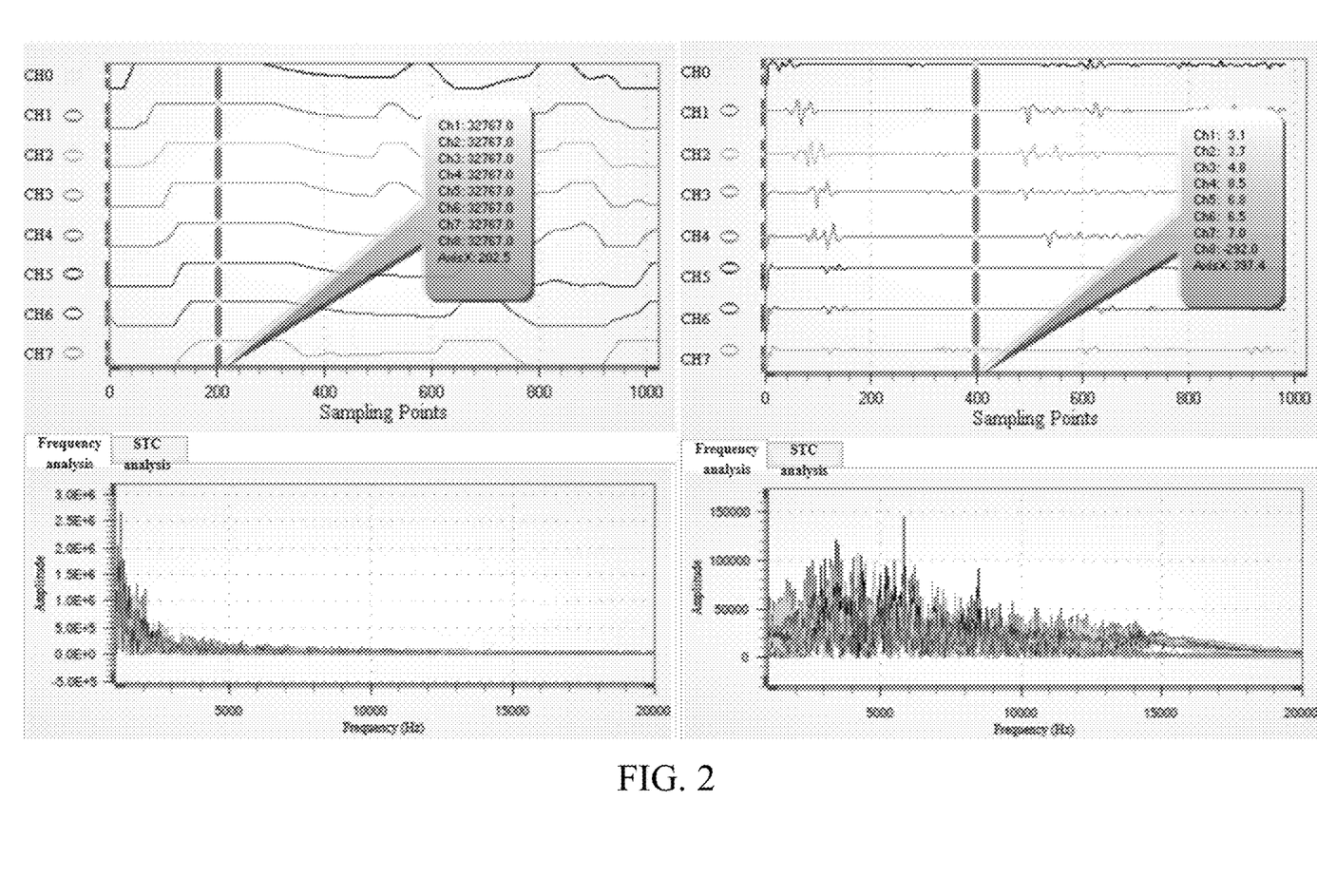
FIG. 2 is a comparison diagram of the raw data and the processed data in the excitation process of the pulser (with large interference).

As shown in FIG. 1, in the case where the pulser disturbance is small, the acoustic effective signal is drowned in the low frequency noise disturbance, but the effective acoustic signal can be extracted after the following data processing. As shown in FIG. 2, the resulting acoustic data sampled during pulser excitation is overshot, the signal waveform is clipped, part of acoustic effective signal is completely lost and cannot be extracted in subsequent processing.

Figure 3:
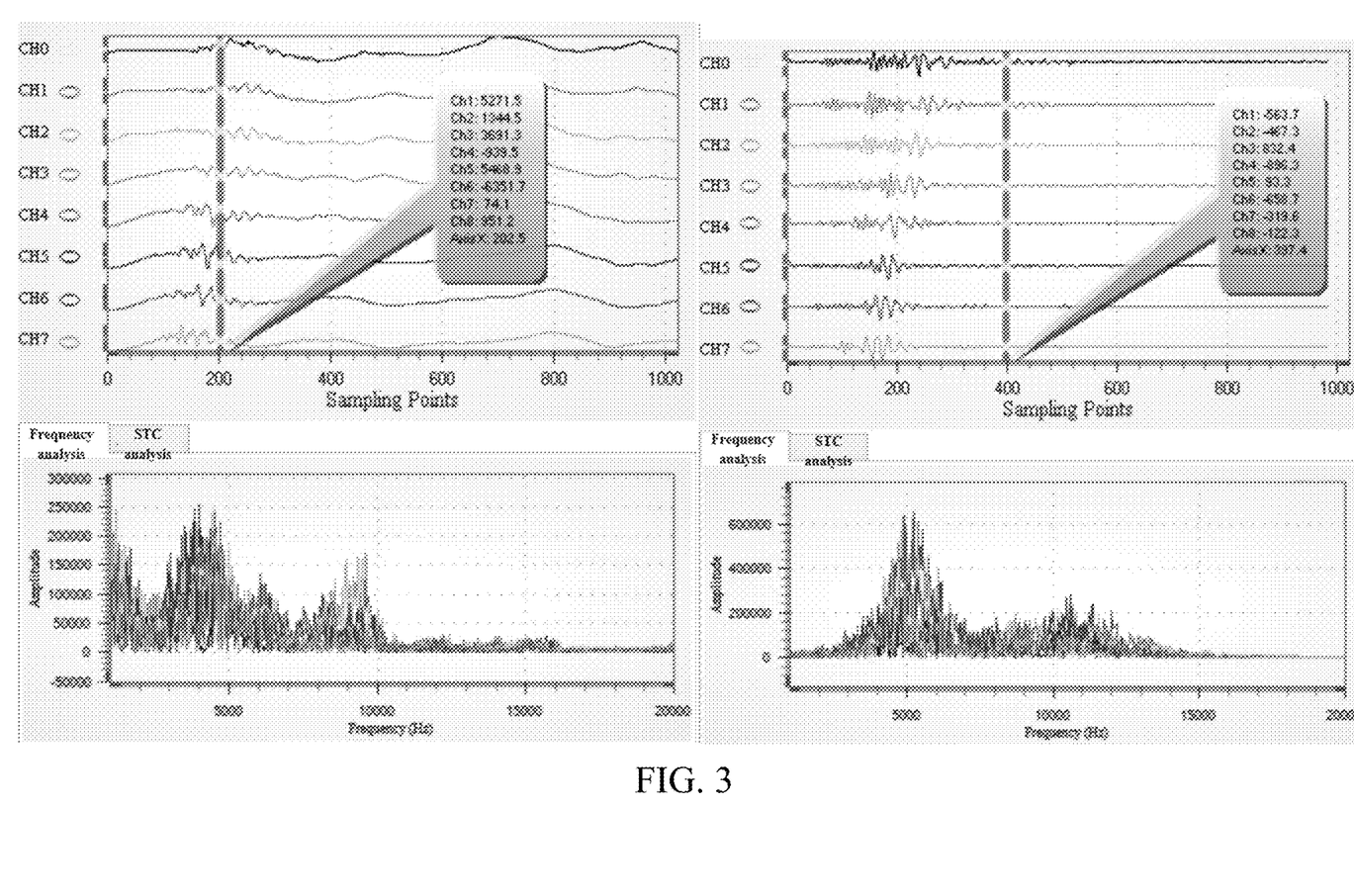
FIG. 3 is a comparison diagram of the raw data and the processed data in the pulser excitation gap in an embodiment of the present disclosure.

As shown in FIG. 3, sampling is performed in the pulser excitation gap by using the method of the present disclosure, so that the noise influence of the impulse pump is avoided to the maximum extent, and the effective acoustic signal is completely extracted.

Figure 4:
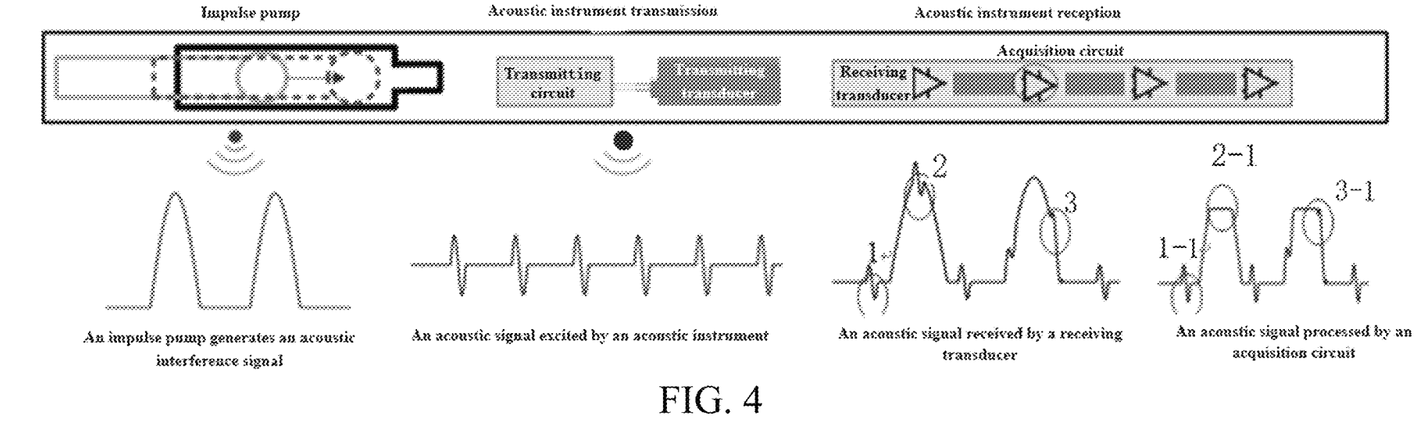
FIG. 4 is a comparison diagram of the effects of collecting acoustic signals in various stages (small interference, large interference and pulser transmission gap).

The inventors have found in long-term practice that, as shown in FIG. 4, reference numbers 1 and 1-1 in the figure show that the acoustic instrument excites the waveforms in the transmission gap of the pulser, and it can be seen that the signal is complete after passing through the acquisition circuit. Reference numbers 2 and 2-1 show that the acoustic instrument excites the signal during the excitation of the pulser, which leads to the signal overshoot of the acoustic signal after passing through the acquisition circuit, and the effective acoustic signal is completely lost. Reference numbers 3 and 3-1 refer to the received waveforms under the condition of small interference from the pulser, and part of the effective signal is lost.

The embodiments of the disclosure discloses a noise reduction measurement method of acoustic while drilling data based on signal synchronization, which performs pre-sampling on an acoustic signal while before effective excitation of a low-frequency impulse pump, then extracts center frequency and phase information of noise of the low-frequency impulse pump by fast Fourier transform, and adjusts the excitation and sampling time of the acoustic signal according to the center frequency and phase information of the noise of the low-frequency impulse pump.

Figure 5:
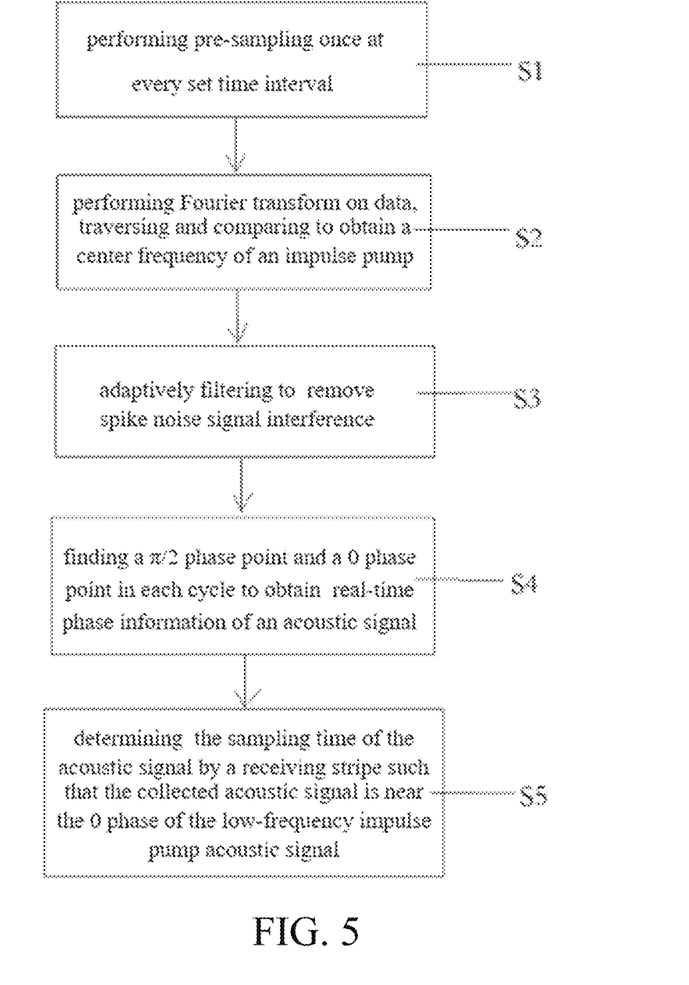
FIG. 5 is a flow diagram of a noise reduction measurement method of acoustic while drilling data based on signal synchronization according to the embodiment of the present disclosure.

As shown in FIG. 5, the noise reduction measurement method of acoustic while drilling data based on signal synchronization according to an embodiment of the present disclosure specifically includes:

S1, a timer time1 is set, and pre-sampling is performed once at every set time interval;

S2, fast Fourier transform processing is performed on raw data of a pre-sampled acoustic signal to obtain corresponding spectral data, and the spectral data is traversed and compared to obtain a center frequency f of the low-frequency impulse pump;

S3, the pre-sampled raw data is adaptively filtered according to the center frequency f to remove spike noise interference in the raw data;

S4, the adaptively filtered acoustic signal data in step S3 is processed to find a maximum value in each cycle, and the phase is $\pi/2$; then a sampling point corresponding to a 0 phase is obtained according to the center frequency f so as to obtain real-time phase information of a low-frequency impulse pump acoustic signal; and S5, a transmission interval of an acoustic instrument is determined according to the center frequency f; and, based on the real-time phase information of the low-frequency impulse pump acoustic signal, the sampling time of the acoustic signal by a receiver strip is determined such that the collected acoustic signal is near the 0 phase of the low-frequency impulse pump acoustic signal, and data overshoot is avoided.

After the above steps S1-S5, the subsequent acoustic signal data is first stored in Nandflash to provide data for ground processing software, and then the acoustic signal data is transmitted to a downhole time difference processing module and the compressional wave and shear wave time difference information of the formation will be obtained through STC processing.

In a specific embodiment, since the impulse pump will be restarted frequently during drilling, the phase 0 of the low-frequency impulse pump signal needs to be re-determined after each power-on, and the phase 0 of the low-frequency impulse pump signal needs to be re-synchronized with the sampling time.

In a specific embodiment, with the continuous drilling work, the frequency of the downhole impulse pump will also shift and jitter. Then in the working process of the low-frequency impulse pump, the synchronization operation is performed once on the sampling time every 10 minutes according to the interrupt triggering of the Time1, in order to reduce the influence of frequency shift and jitter of the impulse pump, thus it can ensure that every sampling is near the initial phase of the impulse pump, and the interference of the impulse pump noise is reduced.

In one specific embodiment, in step S1, pre-sampling is performed once every 10 minutes; the acquisition part of the existing instrument is in a 8-channel 4-array sampling mode, and the sampling frequency is 100 Khz. According to the sampling theorem, in order to collect the complete and effective impulse pump signal, the receiving transducer corresponding to the channel 1 in the array 1 is used as the receiver by means of the signal processor to receive the impulse pump signal. The sampling frequency is set to 200 Hz, the sampling length is 1000 points, and the sampling duration is 5 s by means of equal interval sampling, and a timer counter Time2 starts counting at the same time of starting the sampling, and the counting cycle is 5 ms.

In a specific embodiment, in step S3, different filter arrays built in advance in signal processing are selected according to different center frequencies f to remove spike noise interference in the data.

In a specific embodiment, in step S4, the filtered acoustic signal data is compared by bubble sort algorithm to find a maximum value in each cycle, and the phase is $\pi/2$; and the real-time phase information of the low-frequency impulse pump signal is obtained by the following method:

when starting sampling, the timer counter Time 2 starts counting at the same time, wherein the timer counter Time2 is always in a state of accumulating counting, the value of a first point of the sampling data corresponding to the timer counter Time2 is 1, if the sampling point corresponding to the 0 phase is the t-th, then the corresponding impulse pump signal is 0 phase when the value of the timer counter Time2 is t; according to the center frequency f and a counter real-time value N of the timer counter Time2, the real-time phase information of the impulse pump signal is obtained:

$$\varphi_w = \frac{((N-t)\% \ Tn)}{Tn} * 2\pi;$$

wherein: $\varphi_w$ is the real-time phase of the impulse pump transmission cycle; Tn is the number of sampling points included in each impulse pump transmission cycle, Tn=200/f.

In a specific embodiment, step S5 is specifically as follows:

according to the center frequency f, the transmission interval of the acoustic instrument is determined to be T2=M*(1/f), wherein M is a positive integer greater than 0, i.e. the transmission interval of the acoustic instrument is an integral multiple of the transmission cycle of the impulse pump;

according to the counter real-time value N of the Time2, a counter value $T_w=t+N_w*Tn$ of the Time2 corresponding to the first sampling time is determined, wherein $N_w$ is a positive integer, i.e. the sampling time is consistent with the time corresponding to the 0 phase of the impulse pump transmission cycle; and according to a difference value Time3 between an acoustic emitting time and a receiving time, the counter value of the Time2 corresponding to the acoustic emitting time T3 is obtained as Tm; the cycle of a timer Time4 is set as T2 and the triggering mode is set as cyclic triggering, the timer Time4 is started when the counter value of the Time2 is Tm, an acoustic emitting waveform is immediately excited once every time the timer Time4 interrupts triggering, a receiver strip starts to collect the acoustic signal after a delay of Time3 with a sampling frequency of 100 Khz, a sampling length of 1000 points and a sampling duration of 10 ms; and it is ensured that the sampled data is near the 0 phase of the low-frequency impulse pump acoustic signal, thus the occurrence of the data overshoot problem is avoid. At the same time, the extracted frequency information will also provide a basis for subsequent data filtering processing.

In a specific embodiment, the transmission interval T2 of the acoustic instrument satisfies 5 s<T2<10 s.

Embodiments of the disclosure also provides an information data processing terminal for realizing the method for noise reduction measurement of acoustic while drilling data based on signal synchronization as described above.

Embodiments of the disclosure also provides an embedded processor-readable storage medium including instructions which, when run on an embedded processor, cause the embedded processor to execute the method for noise reduction measurement of acoustic while drilling data based on signal synchronization as described above.

The acoustic data can be sampled when the pulser is not excited in the disclosure, thus actively avoiding the coincidence of the acoustic signal excited by the acoustic instrument with the acoustic signal generated by operation excitation of the pulser, and effectively improving the signal-to-noise ratio of the received signal of the acoustic instrument.

If the method used in the disclosure is not adopted, the effective signal of the acoustic instrument will be completely overshot and the effective signal will be completely lost because the amplitude of the noise signal exceeds the measurement interval of an AD chip.

If the traditional analog high-pass filter is added to the initial part of the acquisition circuit of the receiving transducer, only part of the low-frequency noise generated by the pulser can be filtered out. Although the noise generated by the pulser circulates at a lower frequency, there are high frequency components in the impulse signal, and the noise with high frequency components will lead to overshoot of the AD chip and loss of the effective signal of the acoustic instrument after passing through analog filter.

If the digital filter is used to deal with the noise generated by the pulser in the data processing stage, it is impossible to adjust the parameters of the digital filter by manual interference during the working process of downhole instruments. Thus the digital filter can only filter the noise with a specific frequency, and can not adapt to the noise produced by pulser with different frequency output independently. Moreover, the digital filter can filter out the noise only when the acoustic effective signal is not overshot, and if the signal is overshot, the digital filter will lose its function.

Both the analog RC filter and the digital filter can only filter out part of the noise generated by the pulser, and the situation during the acoustic effective signal sampling when the pulser generates noise cannot be avoided. The disclosure synchronizes the sampling time and the pulser excitation interval time through pre-sampling, spectrum analysis and timing counter processing, thereby effectively suppressing the signal interference of the low-frequency pulser.

It should be described that the above embodiments are only used to illustrate the technical solutions of the present disclosure and not to limit them. Although the present disclosure has been described in detail with reference to preferred embodiments, it should be understood by those skilled in the art that modifications or equivalent substitutions can be made to the technical solutions of the present disclosure without departing from the spirit and scope of the present disclosure, which should be covered within the scope of the claims of the present disclosure.

What is claimed is:

1. A noise reduction measurement method of acoustic while drilling data, comprising:

S0, operating a pulser and an acoustic instrument while drilling to emit acoustic signals comprising a first acoustic signal from the pulser and a second acoustic signal from the acoustic instrument:

S1, setting a timer time1, performing pre-sampling once at every set time interval to obtained raw data of pre-sampled acoustic signals;

S2, performing fast Fourier transform processing on the raw data of the pre-sampled acoustic signals to obtain spectral data, traversing and comparing the spectral data to obtain a center frequency f of the pulser;

S3, filtering the pre-sampled raw data according to the center frequency f to remove spike noise interference in the raw data to obtain a filtered acoustic signal data;

S4, processing the filtered acoustic signal data in step S3 to find a maximum value in each pulser transmission cycle, which has a phase of $\pi/2$; then determining a plurality of sampling points corresponding to a 0 phase according to the center frequency f so as to obtain real-time phase information of the first acoustic signal; and S5, determining a transmission interval of the acoustic instrument according to the center frequency f; and determining, based on the real-time phase information of the first acoustic signal, and sampling the second acoustic signal by the receiver strip such that the second acoustic signal sampled by the receiver strip is near the 0 phase of the first acoustic signal, wherein the 0 phase of the first acoustic signal is re-determined after each power-on of the pulser, and the 0 phase of the second acoustic signal is re-synchronized with the sampling time.

2. The method for noise reduction measurement of acoustic while drilling data based on signal synchronization according to claim 1, wherein the 0 phase of the first acoustic signal is re-determined after each power-on of the pulser, and the 0 phase of the second acoustic signal is re-synchronized with the sampling time.

3. The method for noise reduction measurement of acoustic while drilling data based on signal synchronization according to claim 1, wherein, the synchronization operation is performed on the sampling time once every 10 minutes to reduce the influence of frequency shift and jitter of the pulser.

4. The method for noise reduction measurement of acoustic while drilling data based on signal synchronization according to claim 1, wherein, in step S1, the pre-pre-sampling is performed once every 10 minutes, the sampling frequency is set to 200 Hz, the sampling length is 1000 points, and the sampling duration is 5 s by means of equal interval sampling, and a timer counter Time2 starts counting when starting the sampling, and the counting cycle is 5 ms.

5. The method for noise reduction measurement of acoustic while drilling data based on signal synchronization according to claim 4, wherein, in step S4, the filtered acoustic signal data is compared by bubble sort algorithm to find a maximum value in each cycle, which corresponds to a phase of $\pi/2$; and a first time the sampling point corresponds to 0 phase of the first acoustic signal corresponds to a value of the timer counter Time2, and the value of the timer counter Time2 is t when the number of time the sampling point corresponds to 0 phase of the first acoustic signal is t, and the real-time phase information of the first acoustic signal is:

$$\varphi_w = \frac{((N-t)\% \ Tn)}{Tn} * 2\pi$$

wherein: $\varphi_w$ is the real-time phase of the pulser transmission cycle; Tn is the number of sampling points in each pulser transmission cycle and has a value of 200/f; and N is a real-time value of the timer counter Time2.

6. The method for noise reduction measurement of acoustic while drilling data based on signal synchronization according to claim 5, wherein step S5 comprises:

according to the center frequency f, determining the transmission interval of the acoustic instrument to be T2=M*(1/f), wherein M is a positive integer greater than 0 so that the transmission interval of the acoustic instrument is an integral multiple of the transmission cycle of the pulser;

according to the counter real-time value N of the Time2, determining a counter value Tw=t+Nw*Tn of the Time2 corresponding to the first sampling time, wherein Nw is a positive integer so that the sampling time coincides with the time corresponding to the 0 phase of the pulser transmission cycle; and according to a difference value Time3 between an acoustic emitting time and a receiving time, obtaining the counter value of the Time2 corresponding to the acoustic emitting time T3 as Tm, setting the cycle of a timer Time4 as T2 and the triggering mode as cyclic triggering, starting the timer Time4 when the counter value of the Time2 is Tm, simultaneously exciting an acoustic emitting waveform once every time the timer Time4 interrupts triggering, starting to sample the second acoustic signal after a delay of Time3 by the receiver strip at a sampling frequency of 100 Khz, a sampling length of 1000 points and a sampling duration of 10 ms.

7. The method for noise reduction measurement of acoustic while drilling data based on signal synchronization according to claim 6, wherein the transmission interval T2 of the acoustic instrument satisfies 5 s<T2<10 s.

8. A non-transitory computer readable medium containing computer instructions stored therein for causing a computer processor to execute the method for noise reduction measurement of acoustic while drilling data based on signal synchronization according to claim 1.

* * * * *